US011614460B2

(12) United States Patent
Emery et al.

(10) Patent No.: US 11,614,460 B2
(45) Date of Patent: Mar. 28, 2023

(54) ULTRASOUND AIR-SPEED INDICATOR (71) Applicants: UNIVERSITE DU MANS, Le Mans (FR); ASSOC TRANSFERTS TECHNOLOGIES MANS, Le Mans (FR); CENTRE NATIONAL DE LA RECHERCHE SCIENTIFIQUE (CNRS), Paris (FR)

(72) Inventors: Jacques Emery, Le Mans (FR); Mohammed Tabellout, Fay (FR); Charfeddine Mechri, Alencon (FR)

(73) Assignees: UNIVERSITE DU MANS, Le Mans (FR); ASSOC TRANSFERTS TECHNOLOGIES MANS, Le Mans (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 385 days.

(21) Appl. No.: 17/047,966

(22) PCT Filed: Apr. 19, 2019

(86) PCT No.: PCT/EP2019/060218
§ 371 (c)(1),
(2) Date: Oct. 15, 2020

(87) PCT Pub. No.: WO2019/202139
PCT Pub. Date: Oct. 24, 2019

(65) Prior Publication Data
US 2021/0165017 A1 Jun. 3, 2021

(30) Foreign Application Priority Data

Apr. 20, 2018 (FR) ...................................... 1853483

(51) Int. Cl.
G01P 5/24 (2006.01)
G01F 1/66 (2022.01)
B64D 43/02 (2006.01)

(52) U.S. Cl.
CPC .............. *G01P 5/245* (2013.01); *B64D 43/02* (2013.01)

(58) Field of Classification Search
None
See application file for complete search history.

(56) References Cited

U.S. PATENT DOCUMENTS 4,028,938 A * 6/1977 Eck .......................... G01F 1/667
73/861.31
4,333,353 A 6/1982 Baumoel
(Continued)

FOREIGN PATENT DOCUMENTS

DE 2936909 A1 3/1980
DE 102007030071 B3 11/2008
(Continued)

OTHER PUBLICATIONS

Jun. 25, 2019 International Search Report issued in International Patent Application No. PCT/EP2019/060218.

*Primary Examiner* — Harshad R Patel
(74) *Attorney, Agent, or Firm* — Oliff PLC (57) ABSTRACT

An electronic device for measuring a speed of flow of a fluid that includes at least two electroacoustic transducers adapted for emitting and/or receiving acoustic signals through the flow of the fluid, the electronic device being adapted for determining a measurement of the speed of flow of the fluid from the characteristics of an acoustic signal emitted and one or more acoustic signals received, these received acoustic signals corresponding to reflections of the emitted acoustic signal.

10 Claims, 2 Drawing Sheets

(56) References Cited

U.S. PATENT DOCUMENTS

| | | | |
|---|---|---|---|
| 6,487,916 B1 | 12/2002 | Gomm et al. | |
| 2008/0059085 A1* | 3/2008 | Simon | G01F 1/662 |
| | | | 702/48 |
| 2009/0093977 A1* | 4/2009 | Hauptmann | G01F 1/66 |
| | | | 702/54 |
| 2014/0130606 A1 | 5/2014 | Schwarz | |
| 2016/0334255 A1* | 11/2016 | Gestner | G01F 1/667 |
| 2017/0268915 A1* | 9/2017 | Gestner | G01N 29/4472 |

FOREIGN PATENT DOCUMENTS

| | | |
|---|---|---|
| FR | 2472755 A1 | 7/1981 |
| JP | S57108625 A | 7/1982 |

\* cited by examiner

ULTRASOUND AIR-SPEED INDICATOR

The present invention relates to the field of metrology. The present invention relates more particularly to an air-speed indicator advantageously adapted to the aeronautical field.

In the aeronautical field, the use of air-speed indicators known by the terms pitot tube or Prandtl antenna is known.

Figure 1:
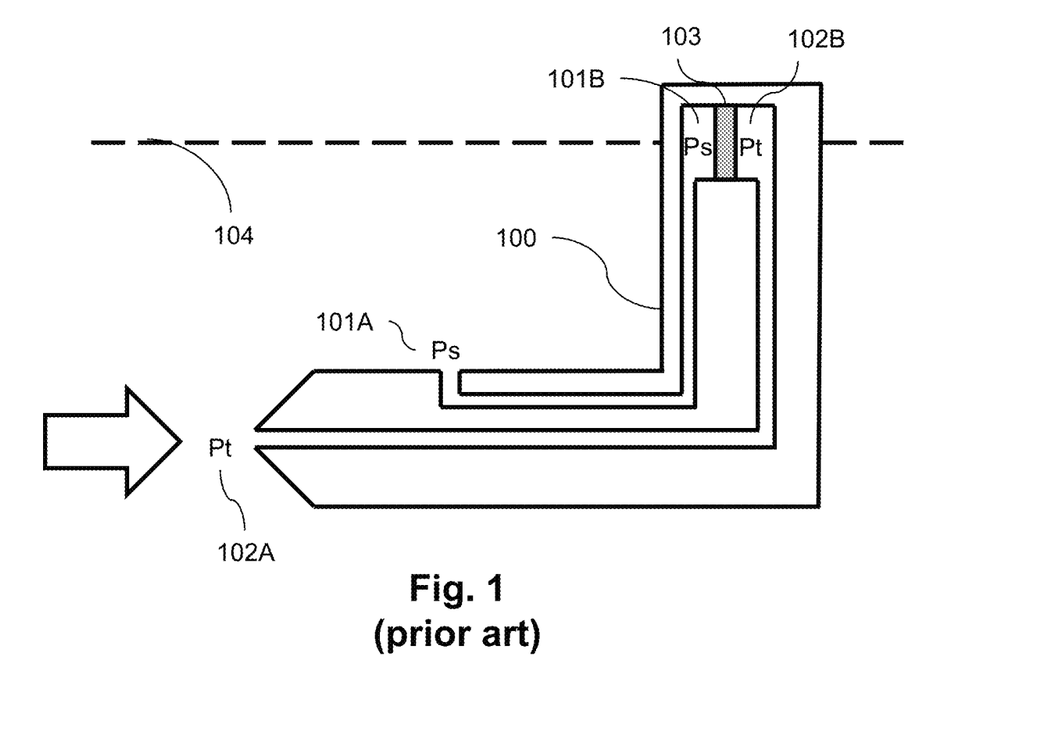
FIG. 1 illustrates schematically a pitot tube as known to a person skilled in the art.

Such an air-speed indicator 100, hereinafter referred to as a pitot tube, is illustrated in FIG. 1. The operating principle of a pitot tube is to measure, for example by means of a differential manometer 103, a difference in pressure between a so-called static pressure Ps and a so-called total pressure Pt. The static pressure Ps is the pressure of a chamber 101B connected by a tube to an air intake 101A situated in the body of the pitot tube 100. The air intake 101A is situated perpendicular to the direction of flow of the fluid, a direction of flow here represented by an arrow going from left to right in FIG. 1. This static pressure Ps does not vary according to the speed of flow of the fluid to be measured. The total pressure Pt is the pressure in a chamber 102B connected by a tube to an air intake 102A situated in the body of the pitot tube 100. The air intake 102A is situated facing the direction of flow of the fluid. The total pressure Pt is the sum of the static pressure Ps and a so-called dynamic pressure. The dynamic pressure is the pressure caused by the flow of the fluid. The difference between the total pressure Pt and the static pressure Ps is therefore solely the dynamic pressure, a dynamic pressure that is dependent on the speed of flow of the fluid. A pitot tube 100 is typically fixed to the fuselage 104 of an aircraft, in a position adapted to the direction of movement of the aircraft, in order to determine a speed of flow of the air around the aircraft, said speed commonly being called relative wind. Knowledge of this relative wind speed is essential for an aircraft, the lift of which is provided by an aerodynamic force, the lifting, produced by means of wings. This is because, below a certain speed, referred to as the stall speed, the aircraft experiences a loss of lift that may lead to an accident.

Pitot tubes can no longer function correctly if one or other of the air inlets 101A or 102A is obstructed. Thus the presence of water, the formation of ice or a collision with foreign bodies (for example insects or birds) may obstruct one of the air inlets. The pitot tube will then give an erroneous measurement of the relative wind, without any indication that this measurement is erroneous. For example, an obstruction of the air inlet 102A will give an erroneous measurement, indicating a relative wind speed that is increasing when the aircraft is merely gaining altitude. In the case of poor weather conditions, particularly with a lack of visibility, it may be impossible for a pilot to perceive that the relative wind measurement supplied by the pitot tube is inconsistent, which may potentially lead to dangerous situations.

It is therefore necessary to propose a solution affording a reliable measurement of the speed of flow of a fluid.

The invention relates to an electronic device for measuring a speed of flow of a fluid, the electronic device comprising:
- a first electroacoustic transducer, adapted for emitting and/or receiving an acoustic signal on a first central axis,
- a second electroacoustic transducer, adapted for emitting and/or receiving an acoustic signal on a second central axis, the first central axis and the second central axis uniquely defining a plane parallel to the direction of flow of the fluid to be measured,
- a surface adapted for reflecting an acoustic signal, the surface being disposed at a point of intersection of the first central axis and of the second central axis, each axis forming the same angle with the straight line orthogonal to the surface passing through the point of intersection, each electroacoustic transducer being situated at the same distance from the surface,
- a module controlling the electroacoustic transducers,
- the electronic device being adapted to allow a free flow of fluid between the surface and the two electroacoustic transducers, and
  - the electronic device being adapted for:
  - emitting, via the first electroacoustic transducer, a first acoustic signal,
  - receiving, via the first or the second electroacoustic transducer, a second acoustic signal corresponding to one or more reflections of the first acoustic signal,
  - determining, according to the distance (h) and the angle (θ) of the first acoustic signal emitted and of the second acoustic signal received, a speed of flow of the fluid.

According to a complementary embodiment of the invention, each electroacoustic transducer is a non-contact ultrasonic sensor operating in a frequency range from 250 kHz to 650 kHz.

According to a complementary embodiment of the invention, the electronic device is adapted for:
- determining a first so-called outward travel time ($T^+$) of an acoustic signal between the first electroacoustic transducer and the second electroacoustic transducer via a reflection on the surface,
- determining a second so-called return travel time ($T^-$) of an acoustic signal between the second electroacoustic transducer and the first electroacoustic transducer via a reflection on the surface,
- determining a speed (V) of the flow of the fluid according to the formula:

$$V = \frac{2h}{\sin(2\theta)}\left(\frac{1}{T^+} - \frac{1}{T^-}\right)$$

According to a complementary embodiment of the invention, the electronic device is adapted for determining the celerity (C) of the sound in the fluid according to the formula:

$$C = \frac{h}{\cos\theta}\left(\frac{1}{T^-} + \frac{1}{T^+}\right)$$

According to a complementary embodiment of the invention, the electronic device comprises a third electroacoustic transducer disposed perpendicularly to the direction of flow of the fluid, the electronic device being adapted for determining the celerity (C) of the sound in the fluid by means of this third electroacoustic transducer.

According to a complementary embodiment of the invention, the first acoustic signal emitted being a monofrequency harmonic acoustic signal with a Gaussian envelope, associated with a first frequency ($f_e$), the second acoustic signal, corresponding to the first acoustic signal reflected, being received by the second electroacoustic transducer and being associated with a second frequency ($f_d$), the electronic device is adapted for determining the speed of flow of the fluid (V) according to the formula:

$$V = \frac{C}{\sin(\theta)} \cdot \frac{(fd - fe)}{fd}$$

According to a complementary embodiment of the invention, the first acoustic signal emitted by the first electroacoustic transducer being an intermittent acoustic so-called burst signal consisting of a string of sinusoidal pulses, the electronic device is adapted for:
- performing an adding of the first acoustic signal and of the second acoustic signal corresponding to the acoustic signal received by the second acoustic transducer, the adding determining a so-called beat signal,
- determining a measurement of the modulation frequency of the beat signal,
- determining a speed of flow of the fluid according to the measurement of the modulation frequency of the beat signal.

The invention also relates to an electronic device for measuring a speed of flow of a fluid, the electronic device being adapted for determining the speed of flow of a fluid in a similar manner to one or more of the electronic devices described in the present document.

The invention also relates to a method for determining the speed of flow of a fluid, the method being performed by an electronic device as described in the present document, the method comprising the steps of:
- emitting, via the first electroacoustic transducer, a first acoustic signal,
- receiving, via the first or second electroacoustic transducer, a second acoustic signal corresponding to one or more reflections of the first acoustic signal,
- determining a speed according to the distance (h) and the angle (0), of the first acoustic signal emitted and of the second acoustic signal received.

The invention also relates to a computer program that can be stored on a medium and/or downloaded from a communication network in order to be read by a processor of an electronic device. This computer program comprises instructions for implementing all or some of the steps of the method for measuring a speed of a flow of a fluid, when said program is executed by the processor.

The invention also relates to an information storage medium or recording medium that can be read by an electronic device, comprising such a computer program.

The features of the invention mentioned above, as well as others, will emerge more clearly from a reading of the following description of an example embodiment, said description being given in relation to the accompanying drawings, among which.

FIG. 1 illustrating schematically a pitot tube as known to a person skilled in the art was described above. Air-speed indicators functioning according to the principle of such a pitot tube equip the majority of aircrafts at the present time, with the drawbacks presented of vulnerability in the face of particular weather conditions.

Figure 2:
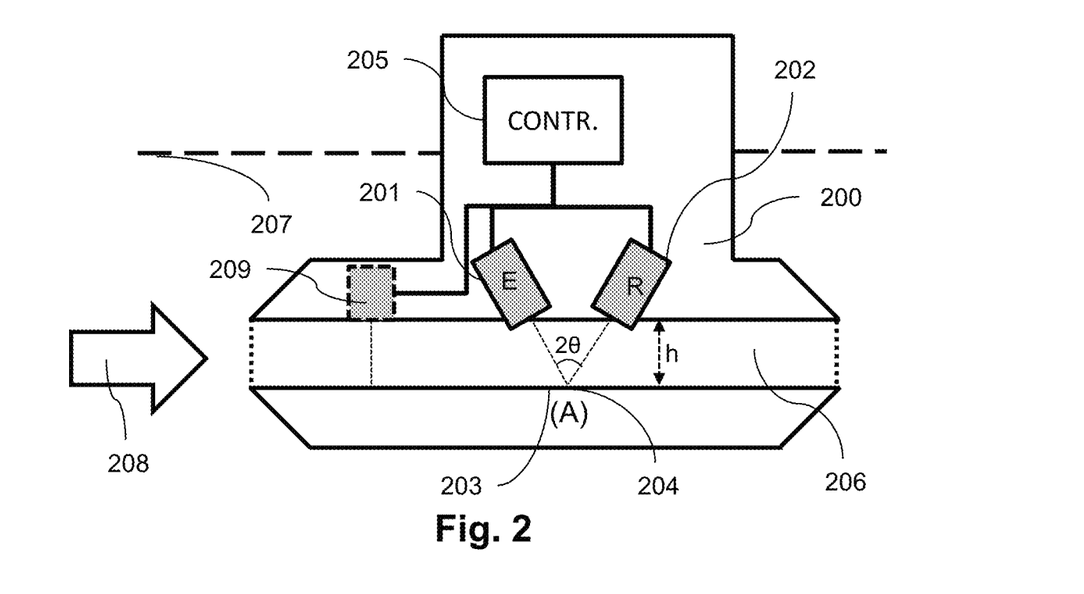
FIG. 2 illustrates schematically an electronic device adapted for measuring a speed of flow of a fluid according to one embodiment of the invention.

FIG. 2 illustrates schematically an electronic device 200 adapted for measuring a speed of flow of a fluid according to one embodiment of the invention.

The electronic device 200 comprises a first electroacoustic transducer E 201, adapted for emitting or receiving an acoustic signal on a first central axis, and a second electroacoustic transducer R 202, adapted for emitting or receiving an acoustic signal on a second central axis. The first central axis and the second central axis define uniquely a plane parallel to the direction of flow of the fluid to be measured (that is to say the plane of the sheet in the case of FIG. 2). The electronic device 200 comprises a surface 203 adapted for reflecting an acoustic signal. The surface is disposed at a point of intersection A 204 of the first central axis and of the second central axis, each axis forming the same angle $\theta$ with the straight line orthogonal to the surface passing through the point of intersection, each electroacoustic transducer being situated at the same distance "h" from the surface 203.

The electronic device 200 makes it possible to make non-intrusive measurements. In other words, the measurement of the speed of flow of a fluid will be done without disturbing the flow of this fluid. The angle of incidence of the sensors, that is to say the angle $\theta$, is chosen so as to maximise the interaction with the flow of the fluid, this interaction being proportional to $\sin(\theta)$, and to minimise the aeroacoustic disturbances, these disturbances being generated by the overflow of the electroacoustic transducers for high angles of incidence. The electronic device 200 is for example designed in accordance with an angle $\theta=24°$, an angle chosen as a compromise for satisfying these two opposing constraints.

An electroacoustic transducer is a device adapted for converting an electrical signal into an acoustic signal and for converting an acoustic signal into an electrical signal. By convention hereinafter in the present document, emission is spoken of for an electroacoustic transducer when it converts an electrical signal into an acoustic signal, the signal emitted being the acoustic signal. Likewise, reception is spoken of for an electroacoustic transducer when it converts an acoustic signal into an electrical signal, the signal received being the acoustic signal, said acoustic signal next being converted in order to be transmitted to the control module 205 in the form of an electrical signal.

In other words, as illustrated in FIG. 2, the electronic device 200 comprises two electroacoustic transducers E and R disposed so that any acoustic signal emitted by one of the two electroacoustic transducers E or R is received by the other electroacoustic transducer E or R after a reflection on the surface 203. For this purpose, the surface 204 is possibly planar, at least over a surface area adapted for best reflecting an acoustic signal between the two electroacoustic transducers E and R. The surface 204 comprises the point of intersection of the two central emission axes of the electroacoustic transducers, each transducer E and R seeing the surface at the same angle $\theta$ with respect to the orthogonal to the surface 203 passing through the point of intersection A.

The electronic device 200 comprises a module 205 controlling acoustic transducers E and R. The control module 205 is adapted for implementing a method for measuring a speed of flow of a fluid.

The control module 205 is adapted for emitting an electrical signal towards the electroacoustic transducer E or R, said electrical signal being transformed by the electroacoustic transducer E or R into an acoustic signal. The control module 205 is adapted for receiving from the electroacoustic transducer E or R an electrical signal corresponding to the reception, and transformation, of an acoustic signal by said electroacoustic transducer E or R.

In FIG. 2, the direction of flow of the fluid measured corresponds to the arrow going from left to right. It should be noted that the electronic device 200 is also adapted for measuring an opposite direction of flow, that is to say going from right to left, without having to modify the electronic device. In the case of a fluid flowing in a different direction, the electronic device 200 is adapted for measuring the component of the speed of flow in the measurement direction indicated on FIG. 2 by the arrow.

The distance "h" separates the two electroacoustic transducers E and R from the reflective surface 203. The electronic device, in particular through the choice of the distance h, is adapted for allowing a free flow of the fluid the speed of flow of which is to be measured between the surface and the two transducers E and R. Free flow means that the speed of flow of the fluid is not disturbed, or possibly not significantly, by the presence of the electronic device.

According to an embodiment of the invention illustrated in FIG. 2, the two electroacoustic transducers E and R are situated so that the ends thereof are just above the surface of a hollow tube 206 of diameter h, the point A being situated on the inside of the surface of this hollow tube. The surface 203 may be flattened locally in order to improve the reflection of an acoustic signal.

According to an alternative embodiment, a surface 203 is positioned by any means facing the electroacoustic transducers E and R, so as to comprise the point A and to best reflect any acoustic signal emitted by one of the electroacoustic transducers towards the other electroacoustic transducer.

The surface 203 is possibly the surface of a metal element benefiting from a surface treatment, for example a polishing. The surface 203 is adapted for best reflecting any acoustic signal emitted by one of the two electroacoustic transducers E or R towards the other electroacoustic transducer R or E. The surface 203 is possibly a planar surface, but may also be adapted in order to maximise the reflection of an acoustic signal from one of the two electroacoustic transducers E or R towards the other electroacoustic transducer R or E.

The electronic device 200 is adapted for emitting, via the first electroacoustic transducer E 201, a first acoustic signal. The control module 205 is adapted for controlling this emission of the first acoustic signal. The electronic device 200 is next adapted for receiving, via the same first electroacoustic transducer E 201, an acoustic signal corresponding to the reflection of the first acoustic signal against the second electroacoustic transducer R 202, via two reflections on the surface 203, and for determining a so-called reference time between the moment of said reception and the moment of emission of the first acoustic signal. In other words, the electronic device 200 is adapted for measuring the time, referred to as the reference time, of a travel of an acoustic signal emitted by an electroacoustic transducer, reflected on the surface 203, reflected by the electroacoustic transducer R 202, reflected once again by the surface 203 and then received by the electroacoustic transducer E 201. In other words, the electronic device 200 is adapted for measuring the propagation time of an acoustic signal making a round trip between the electroacoustic transducer E and the electroacoustic transducer R.

Denoting the travel of an acoustic signal between the electroacoustic transducer E and the point of intersection A as E-A, and the acoustic path between the point of intersection A and the electroacoustic transducer R as A-R, the electronic device 200 is therefore adapted for measuring the acoustic propagation time $T^+$ of an acoustic signal making the outward trip E-A-R. The electronic device 200 is also adapted for measuring the acoustic propagation time $T^-$ of an acoustic signal making the return trip R-A-E.

On the assumption that the direction of flow of the fluid is from left to right, that is to say the one represented by the arrow 203 in FIG. 2, then the speed of the acoustic signal for going from the electroacoustic transducer E to the point A, and for going from the point A to the electroacoustic transducer R, is greater than the speed of the same acoustic signal in the absence of the flow of fluid. In other words, the travel period or time $T^+$ of the trip E-A-R is reduced in the presence of a flow of fluid (in the direction of the arrow 208) compared with a situation without flow of fluid. More generally, the speed of the acoustic signal for going from the electroacoustic transducer E to the point A and for going from the point A to the electroacoustic transducer R is greater, the greater the speed of flow of the fluid.

Likewise, on the same assumption, the speed of the acoustic signal for going from the electroacoustic transducer R to the point A and for going from the point A to the electroacoustic transducer E is less than the speed of the same acoustic signal in the absence of a flow of fluid. In other words, the travel period or time $T^-$ of the trip R-A-E is increased in the presence of a flow of fluid (in the direction of the arrow 208) compared with a situation without flow of fluid. More generally, the speed of the acoustic signal for going from the electroacoustic transducer R to the point A and for going from the point A to the electroacoustic transducer E is lower, the greater the speed of the flow of fluid.

The travel time of the acoustic signals propagating in the direction E-A-R corresponding to $T^+$ and R-A-E corresponding to $T^-$ are expressed thus:

$$T^+ = \left(\frac{2h}{\cos \theta}\right) \cdot \left(\frac{1}{C + V\sin\theta}\right)$$

$$T^- = \left(\frac{2h}{\cos \theta}\right) \cdot \left(\frac{1}{C - V\sin\theta}\right)$$

With:
C: celerity of an acoustic signal (or speed of the sound in the fluid under the temperature, pressure and density conditions,
V: speed of the flow of fluid,
h: distance between the electroacoustic transducers and the surface,
cos(θ): "cosine of the angle θ" function,
sin(θ): "sine of the angle θ" function.
"h" and "θ" are predetermined, "V" is the speed of flow of the fluid that the air-speed indicator is ultimately led to determine.

Since the celerity C of the acoustic signal can vary according to the conditions of temperature, pressure or density of the fluid, and since the round-trip distance R-A-E-A-R (a function of the angle "θ" and of the distance "h"), it is thus possible to determine the celerity of the acoustic signal by a simple measurement of the round-trip time R-A-E-A-R ($T^+$+T) (or reference time). In other words, it is possible to calibrate the electronic device 200 by a measurement, referred to as the calibration measurement, of the round-trip time (or reference time).

Advantageously, the electronic device 200 can therefore dispense with elements for measuring the temperature, pressure or density of the fluid. This reduces the size, the weight and the complexity of the electronic device 200. This increases accordingly the reliability of the electronic device 200. This is because the calibration operation is made reliable since it does not have recourse to one or more measurements of temperature, pressure or density, said measurements being able to be erroneous. The electronic device 200 is thus adapted for determining, according to the distance h, the reference time (or round-trip time R-A-E-A-R) and the angle θ, a speed of the so-called reference acoustic signal (in other words of the sound) "C" in the fluid. Said speed of the sound in the fluid is referred to as the celerity "C".

It should be noted that the round trip time R-A-E-A-R is equal to the round trip time E-A-R-A-E, the influence of the flow of the fluid ultimately being neutral in both cases.

The celerity C can be expressed thus:

$$c = \frac{h}{\cos\theta}\left(\frac{1}{T^-} + \frac{1}{T^+}\right)$$

With:
C: celerity of an acoustic signal (or speed of the sound) in the fluid under the temperature, pressure and density conditions,
h: distance between the electroacoustic transducers and the surface,
$T^+$: round-trip time E-A-R,
$T^-$: round-trip time R-A-E,
cos(θ): "cosine of the angle θ" function.
h and θ are predetermined.
Advantageously the distance h is predetermined in order to reduce the overall size of the electronic device 200.

Advantageously, the celerity C of the acoustic signal can be determined quickly and easily, and thus be updated when the temperature, pressure and/or density conditions change.

According to an embodiment of the invention, the electronic device 200 periodically performs a calibration measurement (for example every 10 milliseconds) and thus records in a memory a value of C regularly updated.

According to an alternative embodiment of the invention, the optional installation of a third electroacoustic transducer 209 at normal incidence with the axis of the flow of the fluid allows an instantaneous determination of the celerity C in the environment under the actual temperature, humidity and pressure conditions. The path of the acoustic wave emitted by the third electroacoustic transducer 209 being orthogonal to the direction of the flow, the speed measured is thus independent of the speed of the moving fluid.

The electronic device 200 is adapted for emitting an acoustic signal via the acoustic transducer E. This signal is received by the electroacoustic transducer R after a first reflection on the surface 203 (point A). Having arrived at the electroacoustic transducer R, this acoustic signal is reflected by the surface of the electroacoustic transducer R and makes the reverse trip R-A-E towards the electroacoustic transducer E via a reflection on the surface 203. The duration of this trip is the duration $T^-$ previously defined. Once arrived at the electroacoustic transducer E, this signal is reflected by the surface of the electroacoustic transducer E and once again makes the reverse trip E-A-R towards the electroacoustic transducer R via a reflection on the surface 203. The duration of this trip is the duration $T^+$ previously defined. In other words, after an emission of the acoustic signal by the electroacoustic transducer E and reception thereof by the electroacoustic transducer R, the acquisition system observes a round trip R-A-E-A-R and monitors the times of arrival of the acoustic signal at the electroacoustic transducer R, and then at the electroacoustic transducer E and once again at the electroacoustic transducer R. In other words, after emission of the acoustic signal from the electroacoustic transducer E, the electronic device 200 determines the measurement as soon as the acoustic signal arrives on the electroacoustic transducer R (instant "$t_1$"), then the electronic device 200 determines the time of arrival of the reflected acoustic signal on the electroacoustic transducer E (the instant "$t_2$"), and finally the electronic device 200 determines the time of arrival of the acoustic signal, once again reflected, on the electroacoustic transducer R (instant "$t_3$"). The duration of the trip R-A-E is "$T^-=t_2-t_1$" and the duration of the trip E-A-R is "$T^+=t_3-t_2$". The electronic device 200 is thus adapted for determining the speed of the reference sound C, and the speed of flow of the fluid as a function of the trip times $T^+$ and $T^-$.

For this purpose, the electronic device 200 can implement one or other of the following methods:

(A) measuring the speed of flow of the fluid by measuring a travel time of an acoustic signal,
(B) measuring the speed of flow of the fluid by measuring a Doppler effect,
(C) measuring the speed of flow of the fluid by measuring a beat frequency.

Method (A) Case: Measurement of a Travel Time

The travel times $T^+$ corresponding to a trip E-A-R and $T^-$ corresponding to a trip R-A-E can be expressed thus:

$$T^+ = \left(\frac{2h}{\cos\theta}\right)\cdot\left(\frac{1}{C+V\sin\theta}\right)$$

$$T^- = \left(\frac{2h}{\cos\theta}\right)\cdot\left(\frac{1}{C-V\sin\theta}\right)$$

With:
$T^+/T^-$: travel time of an outward trip E-A-R/R-A-E, these travel times are measured by the electronic device 200,
h: distance between the electroacoustic transducers (E and R) and the surface 203,
cos(θ): "cosine of the angle θ" function,
sin(θ): "sine of the angle θ" function,
C: celerity of the sound in the fluid, the celerity is determined during a calibration measurement as explained previously,
V: speed of flow of the fluid (or at least the component thereof in the measurement direction defined by the arrow 208 in FIG. 2). The speed "V" thus determined is a positive or negative algebraic quantity according to the direction of flow.

Since all the parameters are known with the exception of "V", speed of flow of the fluid, it is therefore possible to determine the speed "V" of flow of the fluid from a measurement of the travel times $T^+$ and $T^-$.

The speed of flow "V" is then deduced as follows:

$$V = \frac{2h}{\sin(2\theta)}\left(\frac{1}{T^+} - \frac{1}{T^-}\right)$$

Advantageously, the second acoustic signal is a signal of the so-called "chirp" type, emitted in accordance with a pulse compression method.

The pulse compression method is based on a principle of linear frequency modulation. It makes it possible to improve the signal-to-noise ratio (SNR) during echographic measurements by establishing a recognition of a frequency pattern of the acoustic signal over time. However, the performances of this technique degrade appreciably in the case of a propagation that affects this frequency content (scatter, Doppler effect). In this case, the pulses sent by the electroacoustic transducer E 201 may be of the chirps in the frequency band from 250 kHz to 650 kHz. Undergoing a Doppler effect caused by a flow of a fluid, these chirp pulses have a modified frequency content after propagation. Thus, for example, in a flow of a fluid at Mach 0.8 (that is to say at 0.8 times the speed of sound in air), the frequency content of the frequency pattern from 250 kHz to 650 kHz is modified and is shifted in a frequency band from 180 kHz to 460 kHz. In addition, still under the effect of the flow of the fluid, the duration of the frequency pattern changes. Thus the maximum of an intercorrelation function between the acoustic signal emitted and an acoustic signal received drops by a factor of 40 dB, which makes detecting a reflected pulse more complicated when a fluid is flowing at high speed.

In order to correct this possible lack of precision, and according to a complementary embodiment of the invention, it is possible to implement an algorithm considering first of all an initial value "$C_0$" of the speed of the sound equal to "$C_0=340$ m/s" in the medium, this initial value of the speed of sound, combined with the frequency shift measured by Doppler effect, then makes it possible to determine a first value $V_0$ of the speed of the flow. These two data ($C_0$ and $V_0$) are subsequently used to correct the frequency bands received by the pulse compression method. The latter makes it possible to extract $T^+$ and $T^-$ and thus to derive a more precise estimation. It is thus possible to determine a second set of values $C_1$ and $V_1$ from $C_0$ and $V_0$. If the difference between the initial value $C_0$ and the refined value $C_1$ exceeds a predetermined threshold (for example 1%), the value $C_1$ is reinjected as the new initial value of the speed, and the procedure is reiterated n times until the difference between the speeds $C_n$ and $C_{n-1}$ is below the predetermined threshold. In other words, starting from an approximate value of the speed of sound in the medium, iteration loops will refine this speed measurement by firstly estimating the speed of flow:

$$V_0=(C_0/\sin(\theta))\cdot(f_d-f_e)/f_d,$$

$f_d$ and $f_e$ being described below in the description of case B.

This speed of flow will next serve to estimate the changes in the frequency interval of the chirp as well as the duration thereof and therefore to improve the resolution thereof. At the $n^{th}$ iteration, the chirp supplies a new more reliable estimation of the speed of the flow V (denoted $V_n$) and of the speed of sound in the medium C (denoted $C_n$). If the value of $C_n$ differs significantly (that is to say by more than a certain predetermined percentage, for example 1%) from the value $C_{n-1}$ the loop is reinitiated from new values of $C_n$ and $V_n$.

The acoustic signal is thus advantageously a signal of the chirp type linear in frequency over a frequency range of 250 kHz to 650 kHz. The electronic device 200 can then determine an intercorrelation between the acoustic signal emitted by the electroacoustic transducer E and the reflected signals received by the electroacoustic transducers E and R in order to obtain a precise measurement of the corresponding outward E-A-R trip time $T^+$ and of the corresponding outward R-A-E trip time $T^-$.

Method (B) Case: Measurement of the Speed of Flow of the Fluid by Measuring a Doppler Effect For this method (B), the acoustic signal emitted by the acoustic transducer E is advantageously a monofrequency harmonic signal with a Gaussian envelope. Depending on the type of electroacoustic transducer used, an optimum frequency may be 380 kHz.

The method (B) uses the Doppler effect affecting the acoustic signal during the outward trip E-A-R thereof. This is because, the greater the speed of flow of the fluid, the more a frequency shift—towards the low frequencies for a flow from left to right—exists between the acoustic signal emitted by the electroacoustic transducer E and the acoustic signal received by the electroacoustic transducer R.

The electronic device 200 is thus adapted for determining, according to the reference sound speed previously determined (the celerity C), according to the acoustic signal (emitted by the electroacoustic transducer E, and according to the reflected acoustic signal (received by the electroacoustic transducer R after reflection on the surface 203), the speed of flow V of the fluid according to the formula:

$$V = \frac{C}{\sin(\theta)} \cdot \frac{(fd - fe)}{fd}$$

With:

$f_e$: frequency of the monofrequency acoustic signal emitted by the electroacoustic transducer E, possibly determined by a fast Fourier transform (FFT) of the acoustic signal emitted, $f_d$: frequency of the monofrequency signal received by the electroacoustic transducer R, possibly determined by a fast Fourier transform (FFT) of the acoustic signal received, $\sin(\theta)$: "sine of the angle $\theta$" function, C: celerity of the sound in the fluid, the celerity is determined during a calibration measurement as explained previously, V: speed of flow of the fluid (or at least its component in the measurement direction defined by the arrow in FIG. 2).

According to the embodiment of the invention, the celerity C used in this method B can be determined either using the method A as described previously, or by means of the third electroacoustic transducer 209 disposed perpendicular to the direction of flow of the fluid.

Method (C) Case: Measurement of the Speed of Flow of the Fluid by Measuring a Beat Frequency For this method (C), the acoustic signal is advantageously a monofrequency harmonic acoustic signal. It is an intermittent acoustic so-called burst signal that consists of a string of sinusoidal pulses (typically 700 pulses). Depending on the type of electroacoustic transducer used, an optimum frequency may be 380 kHz.

The electronic device 200 is thus adapted for determining, according to the reference speed of sound previously determined (the celerity C), according to the second acoustic signal (emitted by the electroacoustic transducer E) and according to the reflected acoustic signal (received by the electroacoustic transducer R after reflection on the surface 203), the speed of flow of the fluid by adding the second acoustic signal and the received acoustic signal. Adding these two acoustic signals (at least, the electrical representations thereof used by the control module 205) reveals an amplitude-modulated signal (or beat). Measuring the modulation frequency makes it possible to deduce therefrom a difference in frequency, and consequently a speed of flow of the fluid.

According to the embodiment of the invention, the celerity C used in this method C can be determined either using the method A described previously, or by means of the third electroacoustic transducer 209 disposed perpendicularly to the direction of flow of the fluid.

Advantageously, the electronic device 200 is adapted for performing one or other of the methods (A), (B) or (C) in order to determine the speed of flow of the fluid. Advantageously, the electronic device 200 can perform each method (A), (B) or (C) periodically in order to obtain a measurement of the speed of flow of the fluid by different methods. Advantageously, the reliability of the electronic device 200 is thus reinforced. This is because it may happen that, depending on the conditions of use of the electronic device 200, one or other of the methods (A), (B) or (C) gives an erroneous result. Having measurements coming from three different methods therefore makes it possible to eliminate a measurement that would appear inconsistent with respect to the other two measurements.

Advantageously, for an implementation of the invention allowing measurements of speeds up to more than 84 m/s, the electroacoustic transducers E and R are non-contact ultrasonic sensors (NCU) functioning in a frequency range from 250 kHz to 650 kHz, for example around 400 kHz.

Advantageously, these ultrasonic sensors have a wide frequency range, which allows effective implementation of the measurement methods (A), (B) and (C).

Advantageously, the electroacoustic transducer E and/or R is said to be of the air-coupled type. The electroacoustic transducer E and/or R then comprises a surface treatment (for example a layer of polymer) in front of the transducer, said surface treatment allowing acoustic impedance matching between the electroacoustic transducer and the fluid.

The fluid in question may be a so-called "light" fluid, that is to say a gas, or a so-called "heavy" fluid, that is to say a liquid. In the case of a use of the electronic device as an air-speed indicator for an aircraft, the fluid in question is air.

Figure 3:
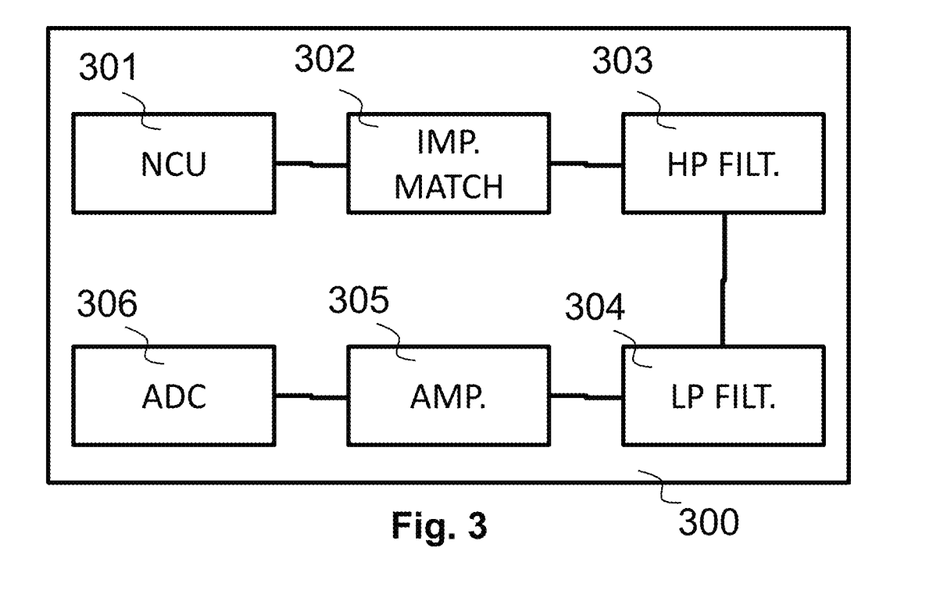
FIG. 3 illustrates schematically a hardware architecture of an electronic device adapted for measuring a speed of flow of a fluid according to one embodiment of the invention.

FIG. 3 illustrates schematically a hardware architecture of an electronic device 300 adapted for measuring a speed of flow of a fluid in an embodiment of the invention. The electronic device 300 is typically the electronic device 200 in FIG. 2.

The module 301 is a transducer of the NCU type operating at a working frequency of 400 kHz. The module 301 allows conversion of an input acoustic signal (not shown) to an electrical signal, said electrical signal being transmitted to the modules 302 et seq for treatment.

The module 302 is a charge amplifier allowing impedance matching between the transducer (module 301) and the module 303.

The module 303 is a high-pass filter. The module 303 is typically a fourth-order passive high-pass filter with a cutoff frequency at around 10 kHz. This module 303 makes it possible to filter the low-frequency interfering frequencies generated by the flow of the fluid. This is because the flow generates low-frequency acoustic pressures.

The module 304 is a low-pass filter. The module 304 is typically a 2.5 MHz anti-aliasing filter.

The module 305 is an amplifier. The electrical signal is typically amplified in order to adapt the amplitude of the electrical signal to the following analogue to digital conversion module 306. The amplification is typically 20 dB.

The module 306 is an acquisition module allowing conversion of the analogue electrical signal into a digital signal. The acquisition module typically allows sampling on 16 bits at 5 MS/s.

Figure 4:
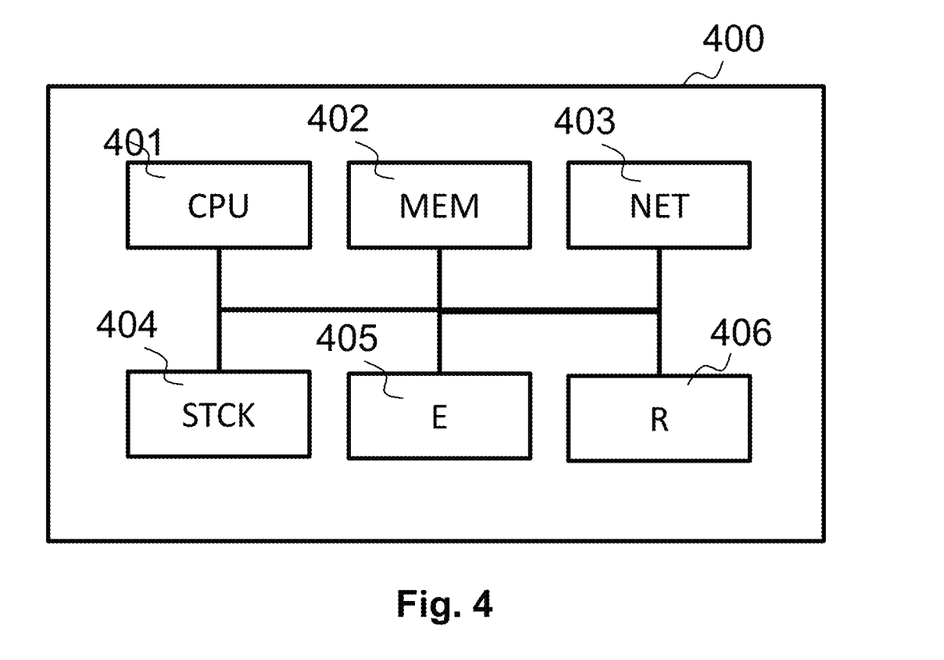
FIG. 4 illustrates schematically a hardware architecture of an electronic device adapted for measuring a speed of flow of a fluid according to an alternative embodiment of the invention.

FIG. 4 illustrates schematically a hardware architecture of an electronic device 400 adapted for measuring a speed of flow of a fluid according to an alternative embodiment of the invention.

The electronic device 400 corresponds for example to the electronic device 200 in FIG. 2.

The electronic device 400 comprises, connected by a communication bus: a processor or CPU (central processing unit) 401; a memory MEM 402 of the RAM (random access memory) and/or ROM (read only memory) type, a network module NET 403, and a storage module STCK 404 of the internal storage type. The storage module STCK 404 may be of the hard disk type HDD (hard disk drive) or SSD (solid-state drive), or of the external storage medium reader type, such as an SD (Secure Digital) card reader. The processor CPU 401 can record data, or information, in the memory MEM 402 or in the storage module STCK 404. The processor CPU 401 can read data recorded in the memory MEM 402, in the storage module STCK 404 or in a database. These data may correspond to configuration parameters. The network module NET 303 allows connection of the electronic device 400 to a communication network, for example to a network of an onboard system of an aircraft. The network module NET 403 enables the electronic device 400 to send and respectively to receive messages intended for and respectively coming from one or more items of equipment of an avionic system.

The processor CPU 401 is capable of executing instructions loaded in the memory MEM 402, for example from the storage module STCK 404 or from a communication network via the network module NET 403. When the electronic device 400 is powered up, the processor CPU 401 is capable of reading instructions from the memory MEM 402 and executing them. These instructions form a computer program causing the implementation, by the processor CPU 401, of all or some of the methods and steps described above, particularly in the description of FIG. 2. These instructions may correspond to the calibration method and/or to the method (A), (B) and/or (C) previously described. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit).

Advantageously, the electronic device 200, 300, 400 comprises an attachment system for attaching said electronic device to a fuselage of an aircraft.

The invention claimed is:

1. An electronic device for measuring a speed of flow (V) of a fluid, the electronic device comprising:
 a first electroacoustic transducer (E), adapted for emitting and/or receiving an acoustic signal on a first central axis,
 a second electroacoustic transducer (R), adapted for emitting and/or receiving an acoustic signal on a second central axis, the first central axis and the second central axis uniquely defining a plane parallel to the direction of flow of the fluid to be measured,
 a surface adapted for reflecting an acoustic signal, the surface being disposed at a point of intersection (A) of the first central axis and of the second central axis, each axis forming the same angle (θ) with the straight line orthogonal to the surface passing through the point of intersection, each electroacoustic transducer being situated at the same distance (h) from the surface, a module controlling the electroacoustic transducers, the electronic device being adapted to allow a free flow of fluid between the surface and the two electroacoustic transducers, and the electronic device being adapted for:
- emitting, via the first electroacoustic transducer, a first acoustic signal,
- receiving, via the first or the second electroacoustic transducer, a second acoustic signal corresponding to one or more reflections of the first acoustic signal,
- determining, according to the distance (h) and the angle (θ) of the first acoustic signal emitted and of the second acoustic signal received, a speed of flow of the fluid, wherein, the first acoustic signal emitted being a monofrequency harmonic acoustic signal with a Gaussian envelope, associated with a first frequency ($f_e$), the second acoustic signal, corresponding to the first acoustic signal reflected, being received by the second electroacoustic transducer and being associated with a second frequency ($f_d$), the electronic device being adapted for determining the speed of flow of the fluid (V) according to the formula:

$$V = \frac{C}{\sin(\theta)} \cdot \frac{(fd - fe)}{fd}.$$

2. The electronic device according to claim 1, wherein each electroacoustic transducer being a non-contact ultrasonic sensor operating in a frequency range from 250 kHz to 650 kHz.

3. The electronic device according to claim 2, wherein the electronic device being adapted for:
- determining a first so-called outward travel time ($T^+$) of an acoustic signal between the first electroacoustic transducer and the second electroacoustic transducer via a reflection on the surface,
- determining a second so-called return travel time ($T^-$) of an acoustic signal between the second electroacoustic transducer and the first electroacoustic transducer via a reflection on the surface,
- determining a speed (V) of the flow of the fluid according to the formula:

$$V = \frac{2h}{\sin(2\theta)} \left( \frac{1}{T^+} - \frac{1}{T^-} \right).$$

4. The electronic device according to claim 3, wherein the electronic device being adapted for determining the celerity (C) of the sound in the fluid according to the formula:

$$C = \frac{h}{\cos\theta} \left( \frac{1}{T^-} + \frac{1}{T^+} \right).$$

5. The electronic device for measuring a speed of flow of a fluid, wherein the electronic device being adapted for determining the speed of flow of a fluid according to claim 3.

6. The electronic device according to claim 1, wherein the electronic device comprising a third electroacoustic transducer disposed perpendicularly to the direction of flow of the fluid, the electronic device being adapted for determining the celerity (C) of the sound in the fluid by means of this third electroacoustic transducer.

7. The electronic device according to claim 1, wherein the first acoustic signal emitted by the first electroacoustic transducer being an intermittent acoustic so-called burst signal consisting of a string of sinusoidal pulses, the electronic device being adapted for:
- performing an adding of the first acoustic signal and of the second acoustic signal corresponding to the acoustic signal received by the second acoustic transducer, the adding determining a so-called beat signal,
- determining a measurement of the modulation frequency of the beat signal,
- determining a speed of flow of the fluid according to the measurement of the modulation frequency of the beat signal.

8. A method for determining the speed of flow of a fluid, the method being performed by an electronic device, the electronic device comprising:
- a first electroacoustic transducer (E), adapted for emitting and/or receiving an acoustic signal on a first central axis,
- a second electroacoustic transducer (R), adapted for emitting and/or receiving an acoustic signal on a second central axis, the first central axis and the second central axis uniquely defining a plane parallel to the direction of flow of the fluid to be measured,
- a surface adapted for reflecting an acoustic signal, the surface being disposed at a point of intersection (A) of the first central axis and of the second central axis, each axis forming the same angle (θ) with the straight line orthogonal to the surface passing through the point of intersection, each electroacoustic transducer being situated at the same distance (h) from the surface,
- a module controlling the electroacoustic transducers, the electronic device being adapted to allow a free flow of fluid between the surface and the two electroacoustic transducers, and the electronic device being adapted for:
- emitting, via the first electroacoustic transducer, a first acoustic signal,
- receiving, via the first or the second electroacoustic transducer, a second acoustic signal corresponding to one or more reflections of the first acoustic signal,
- determining, according to the distance (h) and the angle (θ) of the first acoustic signal emitted and of the second acoustic signal received, a speed of flow of the fluid, and the method comprising the steps of:
- emitting, via the first electroacoustic transducer, a first acoustic signal,
- receiving, via the first or second electroacoustic transducer, a second acoustic signal corresponding to one or more reflections of the first acoustic signal,
- determining a speed of flow of the fluid according to the distance (h) and the angle (θ) of the first acoustic signal emitted and of the second acoustic signal received wherein, the first acoustic signal emitted being a monofrequency harmonic acoustic signal with a Gaussian envelope, associated with a first frequency ($f_e$), the second acoustic signal, corresponding to the first acoustic signal reflected, being received by the second electroacoustic transducer and being associated with a second frequency ($f_d$), the electronic device being adapted for determining the speed of flow of the fluid (V) according to the formula:

$$V = \frac{C}{\sin(\theta)} \cdot \frac{(fd - fe)}{fd}.$$

9. Computer program, characterised in that it comprises instructions for implementing, by a processor of an electronic device, the method for determining a speed of flow of a fluid according to claim 8, when the computer program is executed by the processor, the electronic device comprising:
- a first electroacoustic transducer (E), adapted for emitting and/or receiving an acoustic signal on a first central axis,
- a second electroacoustic transducer (R), adapted for emitting and/or receiving an acoustic signal on a second central axis, the first central axis and the second central axis uniquely defining a plane parallel to the direction of flow of the fluid to be measured,
- a surface adapted for reflecting an acoustic signal, the surface being disposed at a point of intersection (A) of the first central axis and of the second central axis, each axis forming the same angle (θ) with the straight line orthogonal to the surface passing through the point of intersection, each electroacoustic transducer being situated at the same distance (h) from the surface,
- a module controlling the electroacoustic transducers, the electronic device being adapted to allow a free flow of fluid between the surface and the two electroacoustic transducers, and the electronic device being adapted for:
- emitting, via the first electroacoustic transducer, a first acoustic signal,
- receiving, via the first or the second electroacoustic transducer, a second acoustic signal corresponding to one or more reflections of the first acoustic signal,
- determining, according to the distance (h) and the angle (θ) of the first acoustic signal emitted and of the second acoustic signal received, a speed of flow of the fluid.

10. Recording medium, able to be read by an electronic device on which the computer program according to claim 9 is stored, the electronic device comprising:
- a first electroacoustic transducer (E), adapted for emitting and/or receiving an acoustic signal on a first central axis,
- a second electroacoustic transducer (R), adapted for emitting and/or receiving an acoustic signal on a second central axis, the first central axis and the second central axis uniquely defining a plane parallel to the direction of flow of the fluid to be measured,
- a surface adapted for reflecting an acoustic signal, the surface being disposed at a point of intersection (A) of the first central axis and of the second central axis, each axis forming the same angle (θ) with the straight line orthogonal to the surface passing through the point of intersection, each electroacoustic transducer being situated at the same distance (h) from the surface,
- a module controlling the electroacoustic transducers, the electronic device being adapted to allow a free flow of fluid between the surface and the two electroacoustic transducers, and the electronic device being adapted for:
- emitting, via the first electroacoustic transducer, a first acoustic signal,
- receiving, via the first or the second electroacoustic transducer, a second acoustic signal corresponding to one or more reflections of the first acoustic signal,
- determining, according to the distance (h) and the angle (θ) of the first acoustic signal emitted and of the second acoustic signal received, a speed of flow of the fluid.

\* \* \* \* \*